United States Patent
Elms et al.

(10) Patent No.: US 7,746,605 B2
(45) Date of Patent: Jun. 29, 2010

(54) ARC FAULT CIRCUIT INTERRUPTER AND METHOD OF DETECTING AND INTERRUPTING A RESISTIVE SERIES ARC OF A POWER CIRCUIT

(75) Inventors: Robert T. Elms, Monroeville, PA (US); Kevin L. Parker, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 503 days.

(21) Appl. No.: 11/834,856

(22) Filed: Aug. 7, 2007

(65) Prior Publication Data

US 2009/0040665 A1 Feb. 12, 2009

(51) Int. Cl.
*H02H 3/00* (2006.01)
*H03L 5/02* (2006.01)

(52) U.S. Cl. ............. 361/42; 361/5; 361/7; 327/307
(58) Field of Classification Search ............... 361/42, 361/5, 7; 327/307
See application file for complete search history.

(56) References Cited

U.S. PATENT DOCUMENTS

| | | | |
|---|---|---|---|
| 4,933,643 A * | 6/1990 | Jandu et al. ............ 330/9 |
| 5,224,006 A | 6/1993 | MacKenzie et al. |
| 5,559,770 A * | 9/1996 | Hiroki et al. ............ 369/44.35 |
| 5,632,092 A * | 5/1997 | Blank et al. ............ 33/361 |
| 5,691,869 A * | 11/1997 | Engel et al. ............ 361/42 |
| 5,940,256 A | 8/1999 | MacKenzie et al. |
| 6,633,467 B2 * | 10/2003 | Macbeth et al. ............ 361/42 |
| 7,302,246 B2 * | 11/2007 | Tseng et al. ............ 455/232.1 |

* cited by examiner

*Primary Examiner*—Stephen W Jackson
*Assistant Examiner*—Zeev Kitov
(74) *Attorney, Agent, or Firm*—Martin J. Moran (57) ABSTRACT

An arc fault circuit interrupter includes line and load terminals, separable contacts in series between the terminals, a neutral conductor, and an operating mechanism opening and closing the contacts and tripping open the contacts in response to a trip signal. A current transformer senses current flowing through the contacts. A voltage sensor detects voltage zero crossings between the load terminal and the neutral conductor. A processor detects a resistive series arc in series with the contacts. A processor routine determines, for each half cycle, samples of the sensed current, an offset value from an average of sensed current samples proximate the voltage zero crossings for the corresponding half cycle, adjusted sensed current samples as adjusted by the offset value, a profile corresponding to a resistive series arc as a function of the sensed current samples and the adjusted samples, and the trip signal in response to occurrences of the profile.

23 Claims, 5 Drawing Sheets

ARC FAULT CIRCUIT INTERRUPTER AND METHOD OF DETECTING AND INTERRUPTING A RESISTIVE SERIES ARC OF A POWER CIRCUIT

BACKGROUND OF THE INVENTION

1. Field of the Invention

This invention pertains generally to circuit interrupters and, more particularly, to arc fault circuit interrupters. The invention also relates to methods of detecting and interrupting a resistive series arc of a power circuit.

2. Background Information

Conventional overcurrent protection devices for alternating current (AC) electrical systems, such as circuit breakers and overload relays, typically do not respond to arc faults. Such faults often have a high resistance, in order that the fault current is below the instantaneous trip current of such protection devices. Arc faults in AC systems also tend to be intermittent, such that they do not generate the time integrated values of current needed to activate a delayed trip feature in a typical circuit protection device.

A common approach to arc fault detection recognizes that the arc current is considerably distorted from a pure sine wave. For instance, it contains considerable high frequency noise. In addition, there can be intervals of no current and/or periods of short circuit current. Devices which combine various of these characteristics of arc current have been proposed for arc detectors. Some of them employ microcomputers to apply the various criteria to the current waveform.

Another approach to arc fault detection relies on the fact that an arc between spaced conductors or a gap in a conductor can only be struck when the voltage rises to the break down voltage across the space or gap. Thus, these detectors respond to the step increase in current produced by arc initiation. Such a detector is described in U.S. Pat. No. 5,224,006. In order to avoid false trips produced by the inrush currents at turn on of some typical loads, another detector of this type, as described in U.S. Pat. No. 5,940,256, looks for a plurality of step increases in current within a certain time interval characteristic of an arc fault, which repetitively strikes and is interrupted. A further improvement on this type of detector, which generates a time attenuated integration of pulses representative of step increases in current, such as those generated by arc faults, is described in U.S. Pat. No. 5,691,869.

Arc fault circuit interrupters (AFCIs) are devices intended to mitigate the effects of arc faults by functioning to deenergize an electrical circuit when an arc fault is detected. Non-limiting examples of AFCIs include: (1) arc fault circuit breakers; (2) branch/feeder arc fault circuit interrupters, which are intended to be installed at the origin of a branch circuit or feeder, such as a panelboard, and which may provide protection from ground faults (e.g., greater than 40 mA) and line-to-neutral faults (e.g., greater than 75 A); (3) outlet circuit arc fault circuit interrupters, which are intended to be installed at a branch circuit outlet, such as an outlet box, in order to provide protection of cord sets and power-supply cords connected to it (when provided with receptacle outlets) against the unwanted effects of arcing, and which may provide protection from line-to-ground faults (e.g., greater than 75 A) and line-to-neutral faults (e.g., 5 to 30 A, and greater than 75 A); (4) cord arc fault circuit interrupters, which are intended to be connected to a receptacle outlet, in order to provide protection to an integral or separate power supply cord; (5) combination arc fault circuit interrupters, which function as either a branch/feeder or an outlet circuit AFCI; and (6) portable arc fault circuit interrupters, which are intended to be connected to a receptacle outlet and provided with one or more outlets.

Figure 1A:
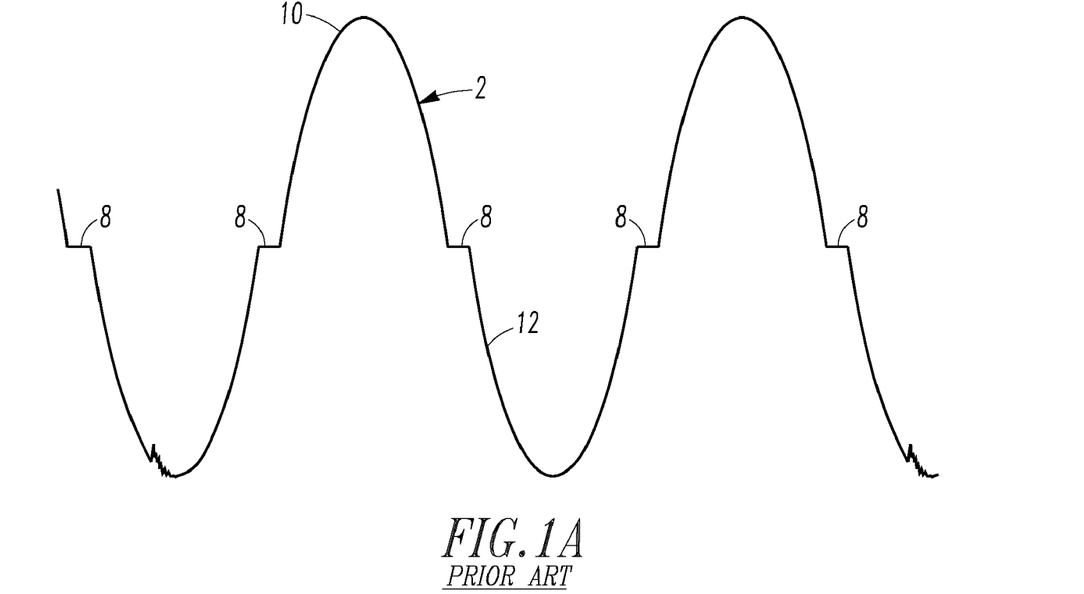
FIG. 1A is a plot of current during a series arc with a resistive load.

FIG. 1A shows the characteristic current 2, which results from a circuit (not shown) in which, for example, a 60 Hz, 120 $V_{RMS}$ source (not shown) is connected in series with a resistive load (not shown), for example, 5 $A_{RMS}$, and an electrical arc is introduced in series with this circuit by a carbon electrode (not shown) and a copper electrode (not shown) separated by a relatively small gap.

Figure 1B:
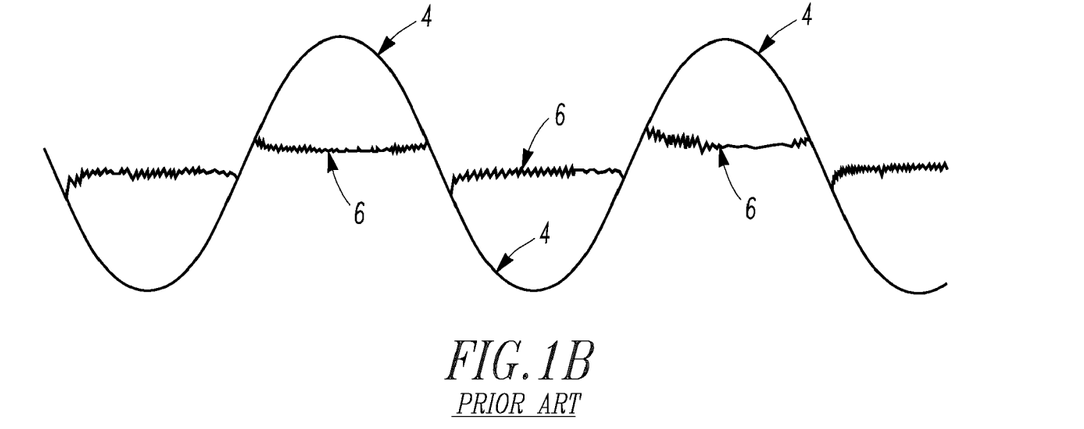
FIG. 1B is a plot of line-to-neutral source voltage and arc voltage during the series arc of FIG. 1A.

FIG. 1B shows the line-to-neutral source voltage 4 and the arc voltage 6 during the series arc of FIG. 1A. During a short period of time, which coincides with the zero crossings of the sinusoidal voltage source, the voltage in the circuit is too low to initiate and sustain an electrical arc across the gap between the carbon and copper electrodes (not shown). During this time, the arc voltage 6 across the gap between these electrodes is equivalent to the source voltage 4 and no current flows in the circuit. This is shown by the "flat spots" 8 of FIG. 1A.

However, when the source voltage becomes sufficiently great enough, an electrical arc is sustained between the electrodes and current flows in the circuit as shown by characteristic current 2 of FIG. 1A, which occurs between the flat spots 8, such as at 10 or 12. As a result, a characteristic "current shape" is associated with electrical arcs in series with a resistive load. This current shape can be seen to be nearly sinusoidal, but having the flat spots 8 or periods of zero current conduction, which coincide with the zero crossings of the source voltage 4.

There is room for improvement in arc fault circuit interrupters.

There is also room for improvement in methods of detecting and interrupting a resistive series arc of a power circuit.

SUMMARY OF THE INVENTION

These needs and others are met by embodiments of the invention, which determine an offset value from an average of a plurality of samples of sensed current proximate voltage zero crossings for corresponding alternating current half cycles. Each of a plurality of adjusted samples of sensed current is determined from a corresponding one of the samples of the sensed current adjusted by the offset value. A profile corresponds to a resistive series arc as a function of a plurality of the samples of the sensed current and the adjusted samples. A trip signal is determined in response to a number of occurrences of the profile for a number of the half cycles, and the power circuit is interrupted responsive to the trip signal.

In accordance with one aspect of the invention, an arc fault circuit interrupter for a power circuit including a plurality of alternating current half cycles comprises: a line terminal; a load terminal; separable contacts electrically connected in series between the line terminal and the load terminal; a neutral conductor; an operating mechanism structured to open and close the separable contacts, the operating mechanism being structured to trip open the separable contacts in response to a trip signal; a current sensor structured to sense current flowing through the separable contacts; a voltage sensor structured to detect a plurality of voltage zero crossings between the load terminal and the neutral conductor, a consecutive pair of the voltage zero crossings defining a corresponding one of the half cycles; and a processor cooperating with the current sensor and the voltage sensor to detect a resistive series arc in series with the separable contacts, the processor comprising a routine structured to determine, for each of the half cycles, a plurality of samples of the sensed current, an offset value from an average of a plurality of the samples of the sensed current proximate the voltage zero crossings for the corresponding one of the half cycles, a plurality of adjusted samples of the sensed current, each of the adjusted samples being a corresponding one of the samples of the sensed current adjusted by the offset value, a profile corresponding to a resistive series arc as a function of a plurality of the samples of the sensed current and the adjusted samples, and the trip signal in response to a number of occurrences of the profile for a number of the half cycles.

The routine may further be structured to determine the profile when each of a first plurality of the samples of the sensed current is about zero proximate a corresponding one of the voltage zero crossings for the corresponding one of the half cycles and when each of a second plurality of the adjusted samples is within a corresponding range of values for the corresponding one of the half cycles.

The routine may be further structured to determine the corresponding range of values as a function of the peak current of the samples of the sensed current for the corresponding one of the half cycles.

The routine may be further structured to determine the profile when each of a plurality of the adjusted samples is within a corresponding range of values for the corresponding one of the half cycles at about +45°, about +90° and about +135° relative to the first one of the consecutive pair of the voltage zero crossings for the corresponding one of the half cycles.

The corresponding range of values for a first one of the adjusted samples at about +45° relative to the first one of the consecutive pair of the voltage zero crossings may be between about 0.50 and about 0.62 times the peak current of a resistive load with no series arcing, the corresponding range of values for a second one of the adjusted samples at about +90° relative to the first one of the consecutive pair of the voltage zero crossings may be between about 0.80 and about 0.90 times the peak current, and the corresponding range of values for a third one of the adjusted samples at about +135° relative to the first one of the consecutive pair of the voltage zero crossings may be between about 0.50 and about 0.62 times the peak current.

The routine may be further structured to determine the corresponding range of values as a function of the peak current of the samples of the sensed current for the corresponding one of the half cycles. The corresponding range of values for a first one of the adjusted samples at about +45° relative to the first one of the consecutive pair of the voltage zero crossings may be between about 0.588 and about 0.729 times the peak current, the corresponding range of values for a second one of the adjusted samples at about +90° relative to the first one of the consecutive pair of the voltage zero crossings may be between about 0.941 and about 1.059 times the peak current, and the corresponding range of values for a third one of the adjusted samples at about +135° relative to the first one of the consecutive pair of the voltage zero crossings may be between about 0.588 and about 0.729 times the peak current.

The routine may be further structured to determine the peak current of the samples of the sensed current for the corresponding one of the half cycles, to determine a value proportional to the peak current, to add the value proportional to the peak current to an accumulator when the profile corresponding to a resistive series arc is determined for the corresponding one of the half cycles, and to subtract a predetermined value from the accumulator for the corresponding one of the half cycles.

The routine may be further structured to determine the offset value from the average of the plurality of the samples of the sensed current proximate the voltage zero crossings at about +11.25° and about −11.25° relative to the first one of the consecutive pair of the voltage zero crossings for the corresponding one of the half cycles.

The routine may be further structured to determine the profile as a function of three of the samples of the sensed current at about +11.25°, about +168.75° and about +191.25° relative to the first one of the consecutive pair of the voltage zero crossings for the corresponding one of the half cycles, and as a function of three of the adjusted samples at about +45°, about +90° and about +135° relative to the first one of the consecutive pair of the voltage zero crossings for the corresponding one of the half cycles.

As another aspect of the invention, a method of detecting and interrupting a resistive series arc of a power circuit including a plurality of alternating current half cycles comprises: sensing current flowing through the power circuit; detecting a plurality of voltage zero crossings of the power circuit, a consecutive pair of the voltage zero crossings defining a corresponding one of the half cycles; determining, for each of the half cycles, a plurality of samples of the sensed current, an offset value from an average of a plurality of the samples of the sensed current proximate the voltage zero crossings for the corresponding one of the half cycles, a plurality of adjusted samples of the sensed current, each of the adjusted samples being a corresponding one of the samples of the sensed current adjusted by the offset value, a profile corresponding to a resistive series arc as a function of a plurality of the samples of the sensed current and the adjusted samples, and a trip signal in response to a number of occurrences of the profile for a number of the half cycles; and interrupting the power circuit responsive to the trip signal.

The method may determine the profile when each of a plurality of the adjusted samples is within a corresponding range of values for the corresponding one of the half cycles at about +45°, about +90° and about +135° relative to the first one of the consecutive pair of the voltage zero crossings for the corresponding one of the half cycles.

The method may determine the offset value from the average of the plurality of the samples of the sensed current proximate the voltage zero crossings at about +11.25° and about −11.25° relative to the first one of the consecutive pair of the voltage zero crossings for the corresponding one of the half cycles.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" means a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

The invention is described in association with an arc fault circuit breaker, although the invention is applicable to a wide range of arc fault circuit interrupters.

Figure 2:
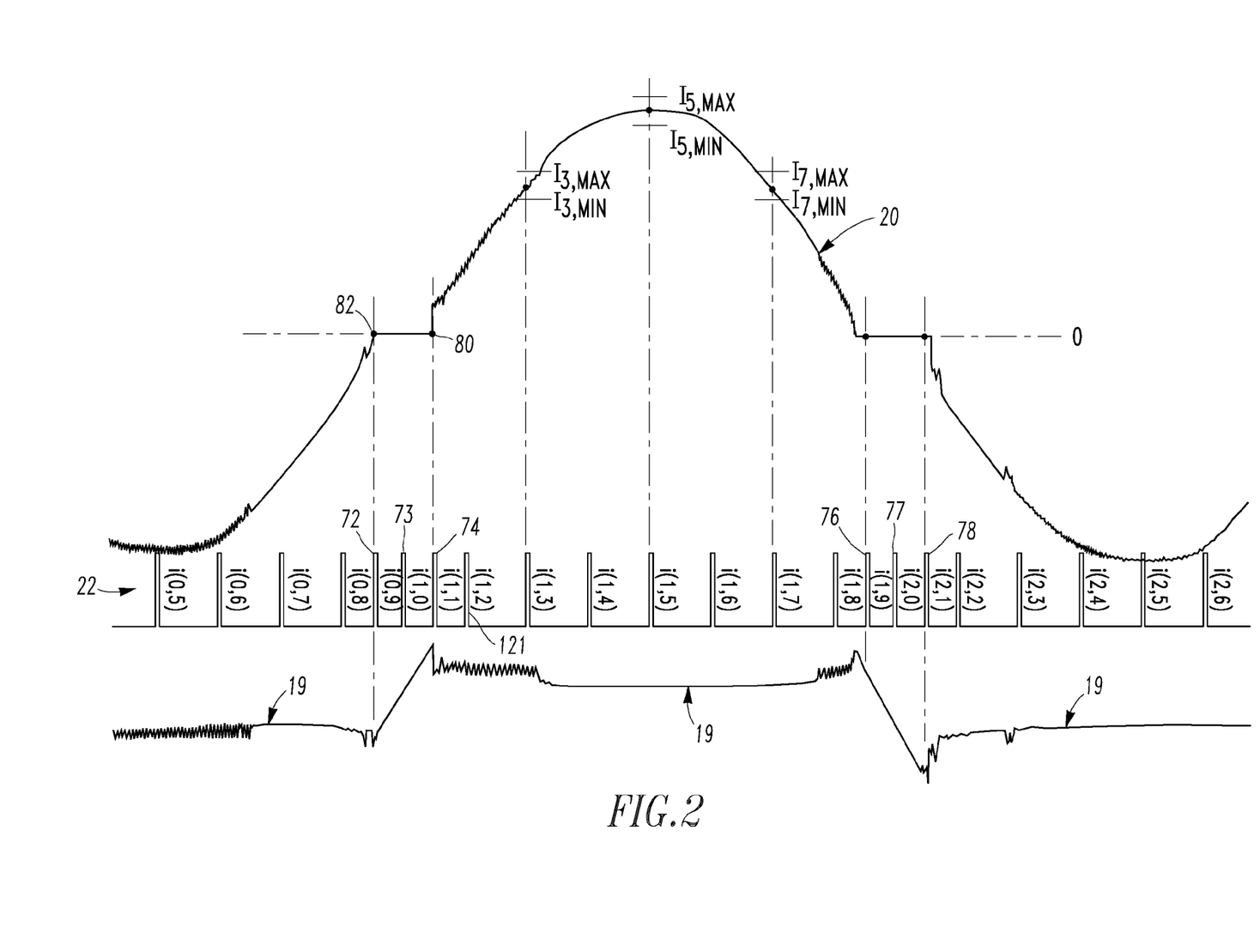
FIG. 2 is a plot of arc voltage, current during a series arc with a resistive load and a plurality of microprocessor interrupts for sampling the current.

FIG. 2 shows the arc voltage 19, current 20 during a series arc with a resistive load, and a plurality of microprocessor interrupts 22 for sampling the current 20. A "shape" arc fault circuit interrupter algorithm is employed to detect, for example, 5 $A_{RMS}$ resistive series arc faults. Resistive series arc have little to no current at one sampling interval on either side of the voltage zero crossing (e.g., about 0.0 A to 0.35 A). At 45° and 135° points after the line-to-neutral voltage zero crossing, the current is about 3.5 A to 4.4 A (roughly about 50%) of the peak current of the 5 $A_{RMS}$ resistive load with no series arcing during that half cycle. At the 90° point after the line-to-neutral voltage zero crossing, the current is about 5.7 A to 6.4 A (roughly about 85%) of the peak current of the 5 $A_{RMS}$ resistive load with no series arcing.

A difficulty occurs when a voltage signal, which corresponds to the zero current level, drifts with time. A corresponding operational amplifier (not shown) has an offset, for example, of about 3.0 mV. The voltage signal, which corresponds to a 0.35 A current, is, for example, about 1 mV in addition to the difference between the supply voltages and reference voltages of the operational amplifier. The observed shift over time of the zero current level is a signal that corresponds to about 1.0 A. If the signal level drift is relatively small from cycle to cycle, then the current on either side of the voltage zero crossing sampling points will be substantially the same at both ends of the half cycle, as sampled on either side of the voltage zero crossing.

Figure 3:
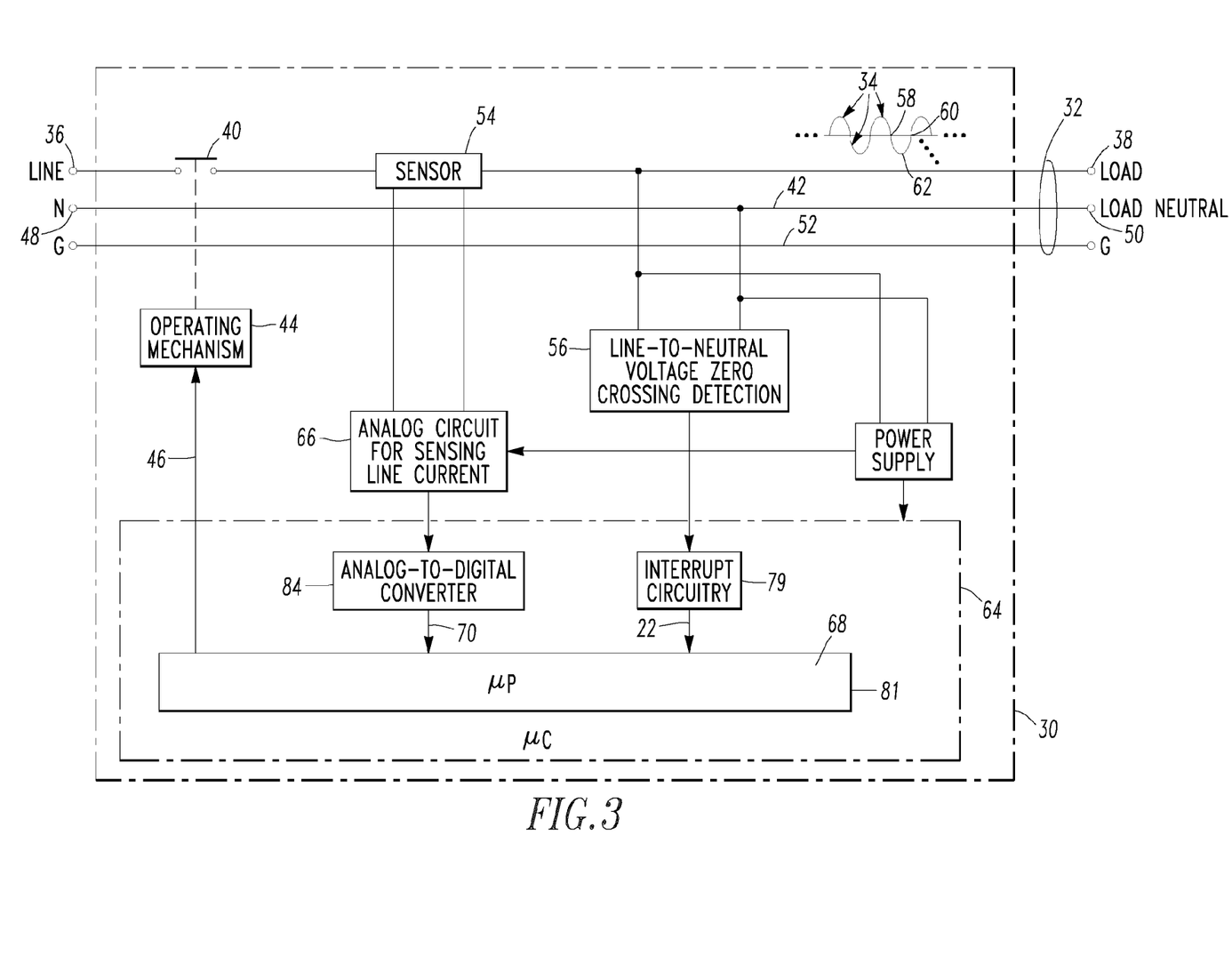
FIG. 3 is a block diagram of a circuit breaker in accordance with embodiments of the invention.

FIG. 3 shows an arc fault circuit breaker 30 for a power circuit 32 including a plurality of alternating current half cycles 34. The arc fault circuit breaker 30 includes a line terminal 36, a load terminal 38, separable contacts 40 electrically connected in series between the line and load terminals 36,38, a neutral conductor 42, and an operating mechanism 44 structured to open and close the separable contacts 40. The operating mechanism 44 is structured to trip open the separable contacts 40 in response to a trip signal 46. Although not required, the circuit breaker 30 may also include one or more of a neutral terminal 48, a load neutral terminal 50 and a ground conductor 52.

A suitable current sensor 54 is structured to sense current flowing through the separable contacts 40. A voltage sensor 56 is structured to detect a plurality of voltage zero crossings between the load terminal 38 and the neutral conductor 42. A consecutive pair of the voltage zero crossings, such as 58,60, define a corresponding one of the half cycles 34, such as 62.

A processor, such as the example microcomputer (µC) 64, cooperates with the current sensor 54 through an analog circuit 66 and with the voltage sensor 56 to detect a resistive series arc in series with the separable contacts 40. As will be discussed, below, in connection with FIGS. 4A-4B, the µC 64 includes a routine 68 structured to determine, for each of the half cycles 34, a plurality of samples of sensed current 70, an offset value from an average of a plurality of the samples of the sensed current 70 proximate the voltage zero crossings, such as 58,60, for a corresponding one of the half cycles 34, a plurality of adjusted samples of the sensed current 70, each of the adjusted samples being a corresponding one of the samples of the sensed current 70 adjusted by the offset value, a profile corresponding to a resistive series arc as a function of a plurality of the samples of the sensed current 70 and the adjusted samples, and the trip signal 46 in response to a number of occurrences of the profile for a number of the half cycles 34.

The determination of the offset value is now described with reference to FIG. 2. There, it can be seen that the absolute values of the differences between the current 20 sampled in response to the microprocessor interrupts 22 at 72 and 74, at 74 and 76, and at 76 and 78 are about zero (e.g., <0.35 A in this example). These interrupts 22 are generated by the interrupt circuitry 79 in response to the voltage sensor 56 of FIG. 3. Since the currents of interest are about zero, a suitable offset value may be set equal to ½ (current sample 80+current sample 82). In other words, the average sensed current value near a voltage zero crossing, such as 58 or 60 (FIG. 3), represents the offset error, since this sensed current value should be zero. Thus, for current comparisons made during a given half cycle, the sensed currents 70 are corrected for the corresponding offset error by subtracting that offset error from the sensed current 70 being compared. This will be discussed in greater detail, below, and in connection with FIGS. 4A-4B.

A mathematical description of a routine for detecting arcs in series with resistive loads is as follows. In general, i(a,b) is line current as sampled at a time corresponding to sampling interval "b" within half-cycle "a". In particular, the following sampled currents are employed:

i(a,0) is instantaneous line current "i" when sampled at 0° relative to the line-to-neutral voltage during half-cycle "a". See, for example, sampled current i(1,0) at microprocessor interrupt 73 and sampled current i(2,0) at microprocessor interrupt 77 of FIG. 2.

i(a,1) is instantaneous line current "i" when sampled at 11.25° relative to the line-to-neutral voltage during half-cycle "a". See, for example, sampled current i(1,1) at microprocessor interrupt 74 and sampled current i(2,1) at microprocessor interrupt 78 of FIG. 2.

i(a,2) is instantaneous line current "i" when sampled at 22.5° relative to the line-to-neutral voltage during half-cycle "a".

i(a,3) is instantaneous line current "i" when sampled at 45° relative to the line-to-neutral voltage during half-cycle "a".

i(a,4) is instantaneous line current "i" when sampled at 67.5° relative to the line-to-neutral voltage during half-cycle "a".

i(a,5) is instantaneous line current "i" when sampled at 90° relative to the line-to-neutral voltage during half-cycle "a".

i(a,6) is instantaneous line current "i" when sampled at 112.5° relative to the line-to-neutral voltage during half-cycle "a".

i(a,7) is instantaneous line current "i" when sampled at 135° relative to the line-to-neutral voltage during half-cycle "a".

i(a,8) is instantaneous line current "i" when sampled at 157.5° relative to the line-to-neutral voltage during half-cycle "a".

i(a,9) is instantaneous line current "i" when sampled at 168.75° relative to the line-to-neutral voltage during half-cycle "a".

If all of the conditions of Equations 1-7, below, are true for a given half-cycle 34 of the sensed current 70, then the "shape" or profile versus phase angle of that half cycle of current is sufficiently similar to the expected profile for an electrical arc in series with a resistive load, that this particular half-cycle of current can be identified as such.

$$|i(n-1,9)| \approx 0 \text{ or } |i(n-1,9)| < \sim 1 A_{PEAK} \qquad \text{(Eq. 1)}$$

$|i(n,1)|\approx 0$ or $|i(n,1)|<\sim 1 A_{PEAK}$ (Eq. 2)

$I_{3,MIN}<|i(n,3)|<I_{3,MAX}$ (Eq. 3)

$I_{5,MIN}<|i(n,5)|<I_{5,MAX}$ (Eq. 4)

$I_{7,MIN}<|i(n,7)|<I_{7,MAX}$ (Eq. 5)

$|i(n,9)|\approx 0$ or $|i(n,9)|<\sim 1 A_{PEAK}$ (Eq. 6)

$|i(n+1,1)|\approx 0$ or $|i(n+1,1)|<\sim 1 A_{PEAK}$ (Eq. 7)

wherein:

n is an integer, which is greater than or equal to 1;

$I_{3,MIN}$ is $0.50*I_{PEAK}$;

$I_{3,MAX}$ is $0.62*I_{PEAK}$;

$I_{5,MIN}$ is $0.80*I_{PEAK}$;

$I_{5,MAX}$ is $0.90*I_{PEAK}$;

$I_{7,MIN}$ is $0.50*I_{PEAK}$;

$I_{7,MAX}$ is $0.62*I_{PEAK}$; and $I_{PEAK}$ is the peak current of the sensed current 70, given that such sensed current is a resistive load with no series arcing.

As non-limiting examples, for $I_{RMS}=5 A_{RMS}$, $I_{3,MIN}$ is about 3.53 $A_{PEAK}$, $I_{3,MAX}$ is about 4.38 $A_{PEAK}$, $I_{5,MIN}$ is about 5.66 $A_{PEAK}$, $I_{5,MAX}$ is about 6.36 $A_{PEAK}$, $I_{7,MIN}$ is about 3.53 $A_{PEAK}$, and $I_{7,MAX}$ is about 4.38 $A_{PEAK}$. These apply when detecting a fixed resistive load having a known RMS current value.

Alternatively, if there is an arc in series with a resistive load of arbitrary value, then $I_{PEAK}$ with no series arc is not known. Here, a suitable estimated value of $I_{PEAK}$ (with series arc)$\approx 0.85*I_{PEAK}$ (with no series arc) may be employed, such that the above values are adjusted by about 1.176 (=1/0.85) to provide:

$I_{3,MIN}$ is $0.588*I_{PEAK}$;

$I_{3,MAX}$ is $0.729*I_{PEAK}$;

$I_{5,MIN}$ is $0.941*I_{PEAK}$;

$I_{5,MAX}$ is $1.059*I_{PEAK}$;

$I_{7,MIN}$ is $0.588*I_{PEAK}$; and $I_{7,MAX}$ is $0.729*I_{PEAK}$.

Continuing to refer to the notation for the sampled values, above, if there is the error term or offset term, which is introduced by the circuit (e.g., formed by current sensor 54, analog circuit 66 and analog-to-digital converter (ADC) 84 (FIG. 3)) used to measure the sensed current i(a,b), then this measurement is given by Equation 8:

$i'(a,b)=i(a,b)+K$ (Eq. 8)

wherein:

i'(a,b) is a flawed measurement of i(a,b);

i(a,b) is the correct measurement of i(a,b); and

K is a constant measurement error or offset term.

In practice, however, the error term "K" can be a function of temperature and may change over time as temperature changes. Furthermore, the temperature can vary widely and unpredictably, thereby resulting in wide and unpredictable variations in the measurement error or offset term.

When the measurement error or offset term is small compared to the quantity being measured (i.e., K<<i(a,b)), then the error or offset term "K" has a negligible effect and the technique of Equations 1-7 for detecting resistive series arcs can be used. However, if the measurement error or offset term is significant compared to the quantity being measured, then the error or offset term "K" can cause improper operation of Equations 1-7, which rely exclusively on identifying a characteristic "current shape" by comparing properly timed current measurements with fixed thresholds. Hence, if there is a significant error in measuring the sensed current 70 (FIG. 3), then this creates a need to modify Equations 1-7, in order to work in a manner independent of current measurement error.

The routine 68 (FIGS. 3 and 4A-4B) does this in two ways. First, if there is an arc in series with a resistive load, then the measurement of any current "flat spots" (i.e., periods of about zero current conduction) should all be equivalent in magnitude, assuming the error or offset term is changing slowly in comparison to the period of the line (e.g., without limitation, 60 Hz) source voltage. Second, an estimation of the measurement error or offset term is calculated and is incorporated in current magnitude comparisons, which take place at 45°, 90° and 135° relative to the corresponding one of the zero crossings, such as 58,60, of the line-to-neutral voltage.

Equation 9 provides a suitable estimate ($K_{EST}$) of the error or offset term "K":

$$K_{EST} = \frac{i'(n-1,9) + i'(n,1)}{2}$$ (Eq. 9)

wherein:

i'(n−1,9) is the flawed measurement of the instantaneous current i(n−1,9); and i'(n,1) is the flawed measurement of the instantaneous current i(n,1).

As shown in Equations 10-14, below, if all of the following conditions are true for a given half-cycle of the sensed current 70, then the load, which generated that half cycle, is considered to have a "current shape" or magnitude profile versus phase angle, which is characteristic of an arc in series with a resistive load, and may, thus, be properly identified as such:

$i'(n+1,1)-i'(n,9)\approx 0$ or $|i'(n+1,1)-i'(n,9)|<\sim 1 A_{PEAK}$ (Eq. 10)

$I_{3,MIN}<|i'(n,3)-K_{EST}|<I_{3,MAX}$ (Eq. 11)

$I_{5,MIN}<|i'(n,5)-K_{EST}|<I_{5,MAX}$ (Eq. 12)

$I_{7,MIN}<|i'(n,7)-K_{EST}|<I_{7,MAX}$ (Eq. 13)

$i'(n,9)-i'(n,1)\approx 0$ or $|i'(n,9)-i'(n,1)|<\sim 1 A_{PEAK}$ (Eq. 14)

Figure 4A:
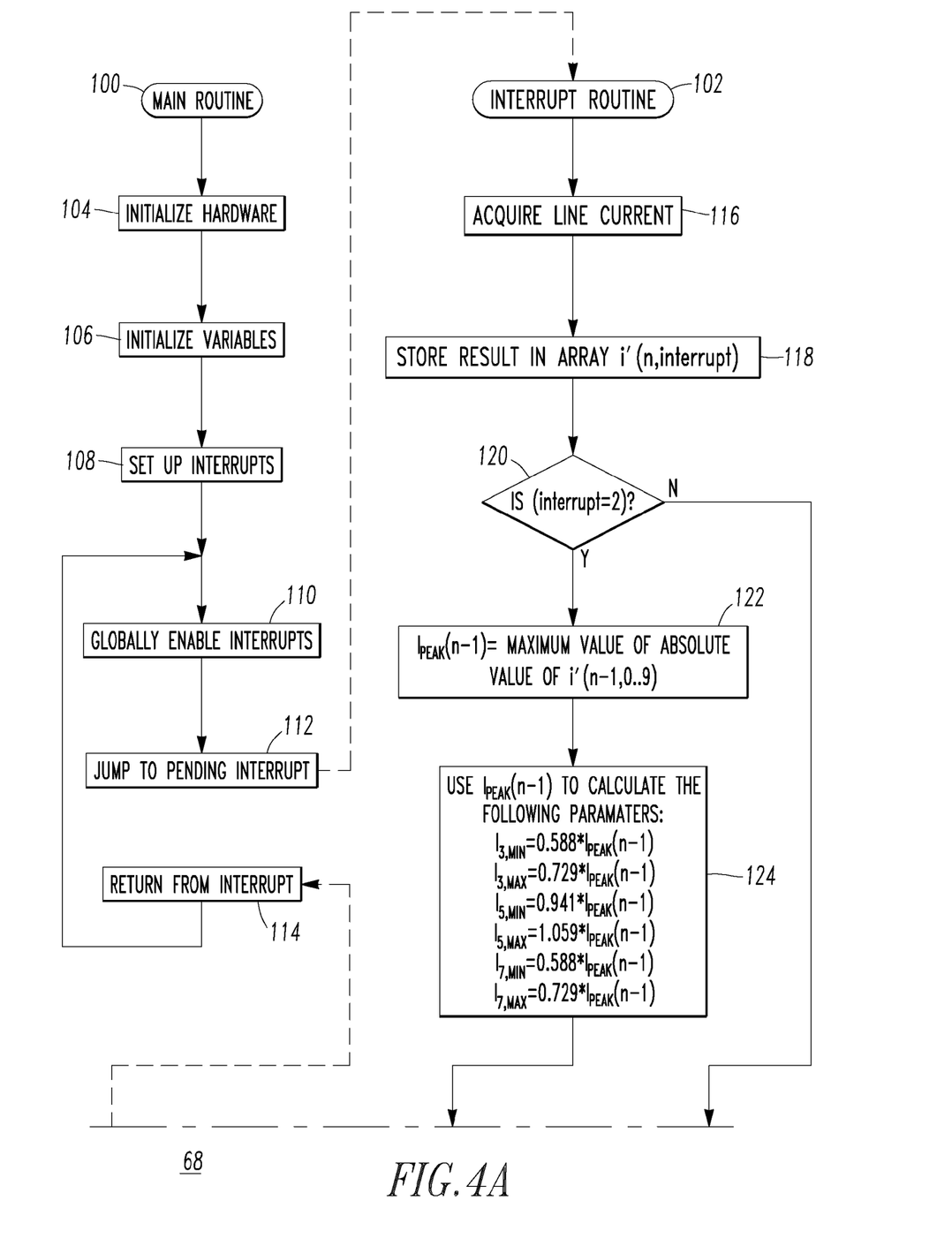
FIGS. 4A-4B form a flowchart of a routine executed by the microprocessor of FIG. 3.
Figure 4B:
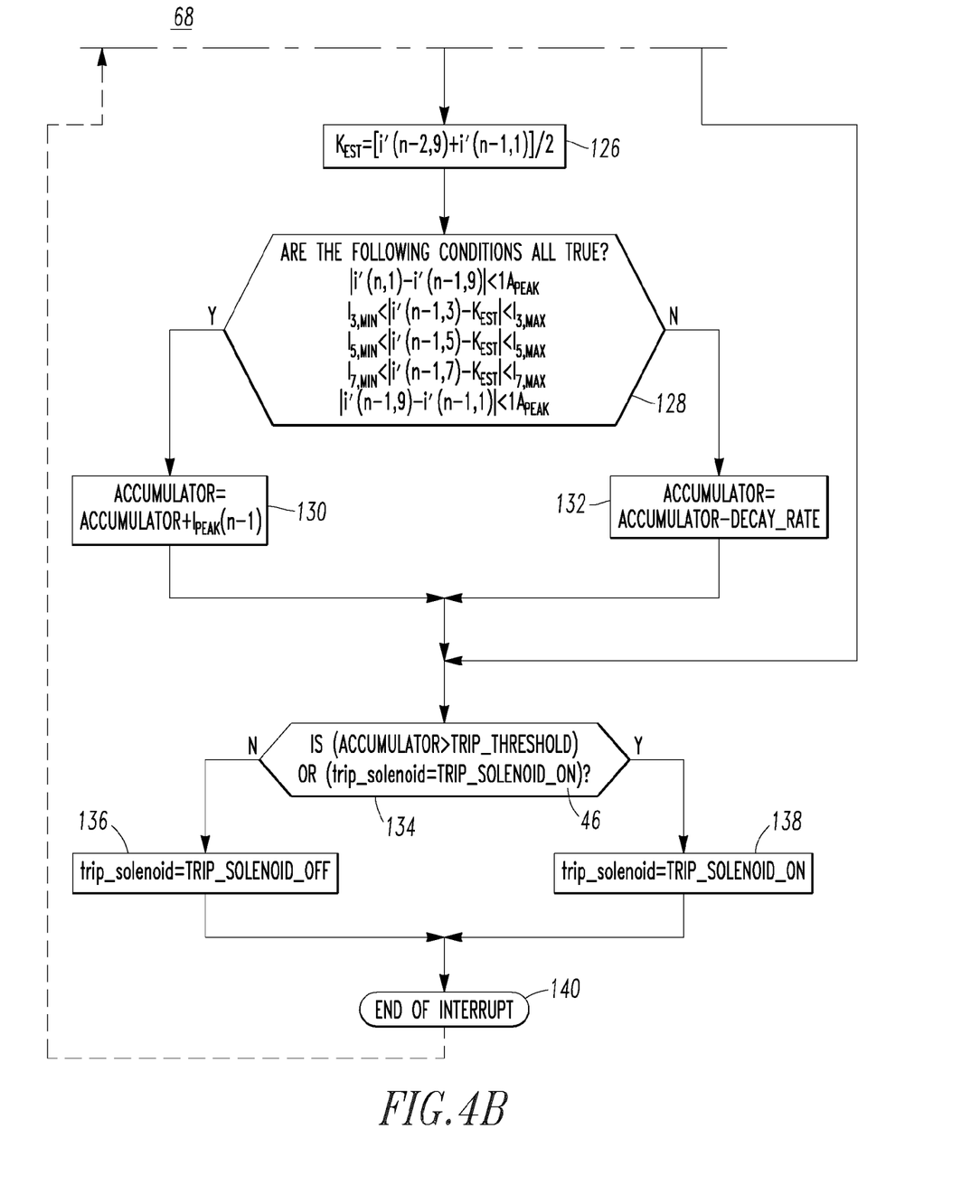

FIGS. 4A-4B show the routine 68, which is executed by the microprocessor (µP) 81 of the µC 64 of FIG. 3. This routine 68 identifies electrical arcs in series with resistive loads by capturing measurements of current magnitude at plural predetermined phase angles relative to the line-to-neutral voltage and comparing the sensed current 70 with the expected profile for an electrical arc in series with a resistive load. In particular, as shown in FIGS. 2 and 3, the current amplitude measurements are synchronized with the line-to-neutral voltage by the voltage sensor 56 and interrupt circuitry 79, which provides the microprocessor interrupts 22, and such measurements are placed at suitable phase angles, which allow detection of the characteristic intervals of zero current that occur around the zero crossings, such as 58,60, of the line-to-neutral voltage. For example, the interrupt 73 (sample i(1,0)) occurs at about the positive going zero crossing of a first or positive half cycle, and the interrupt 77 (sample i(2,0)) occurs at about the negative going zero crossing of the next or negative half cycle.

For FIGS. 4A-4B, the following values apply:

i'(n,k) is the value of sensed current 70 at half cycle "n" and interrupt k n is an integer greater than or equal to 1 k is an integer between 0 and 9 i'(n, 0 . . . 9) is the value of current measurements during present half cycle "n"

i'(n−1, 0 . . . 9) is the value of current measurements during prior half cycle "n−1"

i'(n−2, 0 . . . 9) is the value of current measurements during prior half cycle "n−2"

Similar to, for example, i(a,1), i(a,2) and i(a,3), above, i'(n,1) is the value of the sensed current 70 at half cycle "n" and interrupt 1 at 11.25° relative to the line-to-neutral voltage, i'(n,2) is the value of the sensed current 70 at half cycle "n" and interrupt 2 at 22.5° relative to the line-to-neutral voltage, and i'(n,3) is the value of the sensed current 70 at half cycle "n" and interrupt 3 at 45° relative to the line-to-neutral voltage. The other values i'(n,k) have the same phase angles as the corresponding i(a,b) values, above. In particular, i'(n,3) is the value of the sensed current 70 at half cycle "n" and interrupt 3 at 45° relative to the line-to-neutral voltage, i'(n,5) is the value of the sensed current 70 at half cycle "n" and interrupt 5 at 90° relative to the line-to-neutral voltage, and i'(n,7) is the value of the sensed current 70 at half cycle "n" and interrupt 7 at 135° relative to the line-to-neutral voltage.

The routine 68 includes a main routine 100 and an interrupt routine 102. First, the main routine 100 initializes hardware, at 104, initializes variables, at 106, and sets up interrupts, at 108. Next, at 110, interrupts are globally enabled, after which a jump to a pending interrupt is taken at 112. After the interrupt routine 102 is executed, the return from interrupt occurs at 114, after which step 110 is repeated.

In the interrupt routine 102, the line current is acquired, at 116, by reading the sensed current 70 from the ADC 84. Next, at 118, the result is stored in array i'(n,interrupt). Then, at 120, it is determined, during half-cycle n, if the interrupt is #2 (e.g., for n=1, interrupt 121 of FIG. 2). If so, then steps 122,124, 126,128 check the "shape" or profile versus time of the sensed current 70 of prior half cycle n−1, in order to determine whether it is indicative of a series arc. If the interrupt is other than #2, then execution resumes at 134. Next, at 122, the peak current for the previous half-cycle ($I_{PEAK}$(n−1)) is determined. This peak current is the maximum value of the absolute value of the ten example values of i'(n−1, 0 . . . 9), which is the value of the current measurements during the prior half cycle "n−1". Then, at 124, the peak current for the previous half-cycle ($I_{PEAK}$(n−1)) is used calculate parameters $I_{3,MIN}$, $I_{3,MAX}$, $I_{5,MIN}$, $I_{5,MAX}$, $I_{7,MIN}$ and $I_{7,MAX}$ according to the variables defined after Equation 7 (it being understood that these are for the previous half-cycle (n−1)). Next, at 126, the current measurement error or offset term $K_{EST}$ is determined from Equation 9 (again, it being understood that this is for the previous half-cycle (n−1)). This determines the offset value from the average of two samples of the sensed current 70 proximate the voltage zero crossings, such as 58 or 60, at about +11.25° and about −11.25° relative to the 0° voltage zero crossing for the corresponding half cycle 34.

Then, at 128, it is determined if the conditions of Equations 10-14 are all true for the previous half-cycle (n−1) (again, it being understood that these are for the previous half-cycle (n−1)). This determines the series arc profile when an absolute value of the difference between the samples of the sensed current 70 at about +11.25° and about +168.75° relative to the 0° voltage zero crossing for the corresponding half cycle 34 is less than about 1 ampere, when each of three of the adjusted samples of the sensed current 70 is within a corresponding range of values for the corresponding one of the half cycles at about +45°, about +90° and about +135° relative to the 0° voltage zero crossing for the corresponding half cycle 34, and when an absolute value of the difference between the samples of the sensed current 70 at about +168.75° and about +191.25° relative to the 0° voltage zero crossing for the corresponding half cycle 34 is less than about 1 ampere.

If the test at 128 is true, then at 130, an amount equal to or proportional to the peak current ($I_{PEAK}$(n−1)) is added to an accumulator. Otherwise, if the test at 128 is false, then a predetermined amount (e.g., without limitation, about 1 $A_{PEAK}$) is subtracted from the accumulator. After either 130 or 132, next, at 134, it is determined if the accumulator has exceeded a predetermined trip threshold (e.g., without limitation, about 100 $A_{PEAK}$) (either for the first time, in which case the trip signal 46 is false, or previously, in which case the trip signal 46 is true). If not, then, at 136, the trip signal 46 is set false (e.g., off), such that the circuit breaker 30 remains closed. Otherwise, if the accumulator has exceeded the predetermined trip threshold, then the trip signal 46 is set true (e.g., on) at 138, in order to trip open the separable contacts 40. After either 136 or 138, the interrupt routine 102 ends, at 140, and execution returns to the main loop at 114.

Although separable contacts 40 are disclosed, suitable solid state separable contacts may be employed. For example, the disclosed circuit breaker 30 includes a suitable circuit interrupter mechanism, such as the separable contacts 40 that are opened and closed by the operating mechanism 44, although the invention is applicable to a wide range of circuit interruption mechanisms (e.g., without limitation, solid state or FET switches; contactor contacts) and/or solid state based control/protection devices (e.g., without limitation, drives; soft-starters).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An arc fault circuit interrupter for a power circuit including a plurality of alternating current half cycles, said arc fault circuit interrupter comprising:
   a line terminal;
   a load terminal;
   separable contacts electrically connected in series between said line terminal and said load terminal;
   a neutral conductor;
   an operating mechanism structured to open and close said separable contacts, said operating mechanism being structured to trip open said separable contacts in response to a trip signal;
   a current sensor structured to sense current flowing through said separable contacts;
   a voltage sensor structured to detect a plurality of voltage zero crossings between said load terminal and said neutral conductor, a consecutive pair of said voltage zero crossings defining a corresponding one of said half cycles; and a processor cooperating with said current sensor and said voltage sensor to detect a resistive series arc in series with said separable contacts, said processor comprising a routine structured to determine, for each of said half cycles, a plurality of samples of said sensed current, an offset value from an average of a plurality of said samples of said sensed current proximate the voltage zero crossings for the corresponding one of said half cycles, a plurality of adjusted samples of said sensed current, each of said adjusted samples being a corresponding one of said samples of said sensed current adjusted by said offset value, a profile corresponding to a resistive series arc as a function of a plurality of said samples of said sensed current and said adjusted samples, and said trip signal in response to a number of occurrences of said profile for a number of said half cycles.

2. The arc fault circuit interrupter of claim 1 wherein said plurality of samples of said sensed current is about ten samples of said sensed current for each of said half cycles.

3. The arc fault circuit interrupter of claim 2 wherein said about ten samples of said sensed current for each of said half cycles is ten samples of said sensed current sampled at about 0°, about 11.25°, about 22.5°, about 45°, about 67.5°, about 90°, about 112.5°, about 135°, about 157.5° and about 168.75° relative to the first one of said consecutive pair of said voltage zero crossings for the corresponding one of said half cycles.

4. The arc fault circuit interrupter of claim 1 wherein said routine is further structured to determine said profile when each of a first plurality of said samples of said sensed current is about zero proximate a corresponding one of the voltage zero crossings for the corresponding one of said half cycles and when each of a second plurality of said adjusted samples is within a corresponding range of values for the corresponding one of said half cycles.

5. The arc fault circuit interrupter of claim 1 wherein said routine is further structured to determine said profile when each of a plurality of said samples of said sensed current is about zero proximate a corresponding one of the voltage zero crossings for the corresponding one of said half cycles.

6. The arc fault circuit interrupter of claim 1 wherein said routine is further structured to determine said profile when an absolute value of the difference between said samples of said sensed current at about +11.25° and about +168.75° relative to the first one of said consecutive pair of said voltage zero crossings for the corresponding one of said half cycles is less than about 1 ampere, and when an absolute value of the difference between said samples of said sensed current at about +168.75° and about +191.25° relative to the first one of said consecutive pair of said voltage zero crossings for the corresponding one of said half cycles is less than about 1 ampere.

7. The arc fault circuit interrupter of claim 1 wherein said routine is further structured to determine said profile when each of three of said samples of said sensed current is about zero at about +11.25°, about +168.75° and about +191.25° relative to the first one of said consecutive pair of said voltage zero crossings for the corresponding one of said half cycles.

8. The arc fault circuit interrupter of claim 1 wherein said routine is further structured to determine said profile when each of a plurality of said adjusted samples is within a corresponding range of values for the corresponding one of said half cycles.

9. The arc fault circuit interrupter of claim 8 wherein said routine is further structured to determine the corresponding range of values as a function of the peak current of said samples of said sensed current for the corresponding one of said half cycles.

10. The arc fault circuit interrupter of claim 1 wherein said routine is further structured to determine said profile when each of a plurality of said adjusted samples is within a corresponding range of values for the corresponding one of said half cycles at about +45°, about +90° and about +135° relative to the first one of said consecutive pair of said voltage zero crossings for the corresponding one of said half cycles.

11. The arc fault circuit interrupter of claim 10 wherein the corresponding range of values for a first one of said adjusted samples at about +45° relative to the first one of said consecutive pair of said voltage zero crossings is between about 0.50 and about 0.62 times the peak current of a resistive load with no series arcing, the corresponding range of values for a second one of said adjusted samples at about +90° relative to the first one of said consecutive pair of said voltage zero crossings is between about 0.80 and about 0.90 times said peak current, and the corresponding range of values for a third one of said adjusted samples at about +135° relative to the first one of said consecutive pair of said voltage zero crossings is between about 0.50 and about 0.62 times said peak current.

12. The arc fault circuit interrupter of claim 10 wherein said routine is further structured to determine the corresponding range of values as a function of the peak current of said samples of said sensed current for the corresponding one of said half cycles.

13. The arc fault circuit interrupter of claim 12 wherein the corresponding range of values for a first one of said adjusted samples at about +45° relative to the first one of said consecutive pair of said voltage zero crossings is between about 0.588 and about 0.729 times said peak current, the corresponding range of values for a second one of said adjusted samples at about +90° relative to the first one of said consecutive pair of said voltage zero crossings is between about 0.941 and about 1.059 times said peak current, and the corresponding range of values for a third one of said adjusted samples at about +135° relative to the first one of said consecutive pair of said voltage zero crossings is between about 0.588 and about 0.729 times said peak current.

14. The arc fault circuit interrupter of claim 1 wherein said routine is further structured to determine the peak current of said samples of said sensed current for the corresponding one of said half cycles, to determine a value proportional to said peak current, to add said value proportional to said peak current to an accumulator when said profile corresponding to a resistive series arc is determined for the corresponding one of said half cycles, and to subtract a predetermined value from said accumulator for the corresponding one of said half cycles.

15. The arc fault circuit interrupter of claim 14 wherein said predetermined value is a first predetermined value; and wherein said routine is further structured to determine said trip signal when said accumulator exceeds a second predetermined value.

16. The arc fault circuit interrupter of claim 1 wherein said routine is further structured to determine said offset value from the average of said plurality of said samples of said sensed current proximate the voltage zero crossings at about +11.25° and about −11.25° relative to the first one of said consecutive pair of said voltage zero crossings for the corresponding one of said half cycles.

17. The arc fault circuit interrupter of claim 1 wherein said routine is further structured to determine said profile as a function of three of said samples of said sensed current at about +11.25°, about +168.75° and about +191.25° relative to the first one of said consecutive pair of said voltage zero crossings for the corresponding one of said half cycles, and as a function of three of said adjusted samples at about +45°, about +90° and about +135° relative to the first one of said consecutive pair of said voltage zero crossings for the corresponding one of said half cycles.

18. A method of detecting and interrupting a resistive series arc of a power circuit including a plurality of alternating current half cycles, said method comprising:

sensing current flowing through said power circuit;
detecting a plurality of voltage zero crossings of said power circuit, a consecutive pair of said voltage zero crossings defining a corresponding one of said half cycles;
determining, for each of said half cycles,
a plurality of samples of said sensed current,
an offset value from an average of a plurality of said samples of said sensed current proximate the voltage zero crossings for the corresponding one of said half cycles,
a plurality of adjusted samples of said sensed current, each of said adjusted samples being a corresponding one of said samples of said sensed current adjusted by said offset value,
a profile corresponding to a resistive series arc as a function of a plurality of said samples of said sensed current and said adjusted samples, and
a trip signal in response to a number of occurrences of said profile for a number of said half cycles; and
interrupting said power circuit responsive to said trip signal.

19. The method of claim 18 further comprising
determining said profile when each of three of said samples of said sensed current is about zero at about +11.25°, about +168.75° and about +191.25° relative to the first one of said consecutive pair of said voltage zero crossings for the corresponding one of said half cycles; and
determining said profile when each of a plurality of said adjusted samples is within a corresponding range of values for the corresponding one of said half cycles.

20. The method of claim 19 further comprising
determining the corresponding range of values as a function of the peak current of said samples of said sensed current for the corresponding one of said half cycles.

21. The method of claim 18 further comprising
determining said profile when each of a plurality of said adjusted samples is within a corresponding range of values for the corresponding one of said half cycles at about +45°, about +90° and about +135° relative to the first one of said consecutive pair of said voltage zero crossings for the corresponding one of said half cycles.

22. The method of claim 18 further comprising
determining said offset value from the average of said plurality of said samples of said sensed current proximate the voltage zero crossings at about +11.25° and about −11.25° relative to the first one of said consecutive pair of said voltage zero crossings for the corresponding one of said half cycles.

23. The method of claim 18 further comprising
determining said profile as a function of three of said samples of said sensed current at about +11.25°, about +168.75° and about +191.25° relative to the first one of said consecutive pair of said voltage zero crossings for the corresponding one of said half cycles, and as a function of three of said adjusted samples at about +45°, about +90° and about +135° relative to the first one of said consecutive pair of said voltage zero crossings for the corresponding one of said half cycles.

* * * * *